United States Patent [19]
Kiji et al.

[11] Patent Number: 5,347,447
[45] Date of Patent: Sep. 13, 1994

[54] ADAPTIVE CONTROL SYSTEM AND METHOD THEREOF

[75] Inventors: Junichi Kiji; Naoki Imasaki, both of Urayasu; Tsunekazu Endo, Yokohama, all of Japan

[73] Assignee: Kabushiki Kaisha Toshiba, Kawasaki, Japan

[21] Appl. No.: 966,887

[22] Filed: Oct. 27, 1992

[30] Foreign Application Priority Data

Oct. 28, 1991 [JP] Japan .................................. 3-281607
Jul. 29, 1992 [JP] Japan .................................. 4-202610

[51] Int. Cl.$^5$ .............................. G05B 13/02
[52] U.S. Cl. .................... 364/152; 364/157; 364/165; 318/561
[58] Field of Search ............... 364/157, 152, 164, 148, 364/165, 160-162, 180, 182; 318/561

[56] References Cited
U.S. PATENT DOCUMENTS
4,481,567 11/1984 Kaya et al. ............... 364/157

FOREIGN PATENT DOCUMENTS
2-31201 2/1990 Japan ........................... 364/157

Primary Examiner—Jerry Smith
Assistant Examiner—Steven R. Garland
Attorney, Agent, or Firm—Banner, Birch, McKie & Beckett

[57] ABSTRACT

The basic state feedback gain is derived and selected by the on-line identification based on the on-line input/output data of a controlled object, and at the same time, the sensitivity of the state feedback gain is directly and sequentially calculated based on the on-line input/output data of the controlled object. The state feedback gain is finely adjusted when the state feedback gain is not optimum. Further, the sensitivity of the state feedback gain of the controlled object is derived by the feedback gain sensitivity calculating unit according to the on-line input/output data of the controlled object. When the sensitivity is determined to be zero based on the criterion by the controller, the state feedback gain is determined to be optimum. When the sensitivity is determined to be near zero, the state feedback gain is finely adjusted by use of the sensitivity. When the sensitivity is determined to be greatly deviated from zero, an initialization instruction is supplied to the on-line identifier to initialize the covariance matrix in the on-line identification. Thus, a satisfactory response speed and precision can be obtained even when the present invention is applied to a controlled object dynamic characteristic of which is significantly changed.

6 Claims, 13 Drawing Sheets

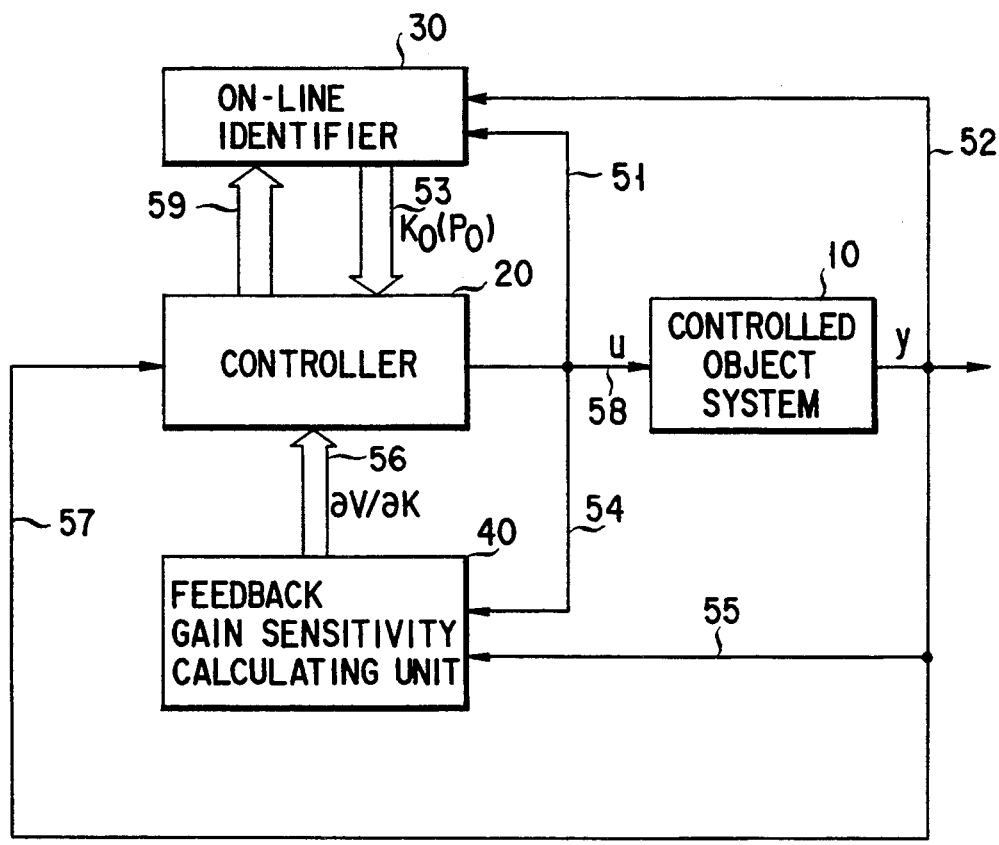
F I G. 1

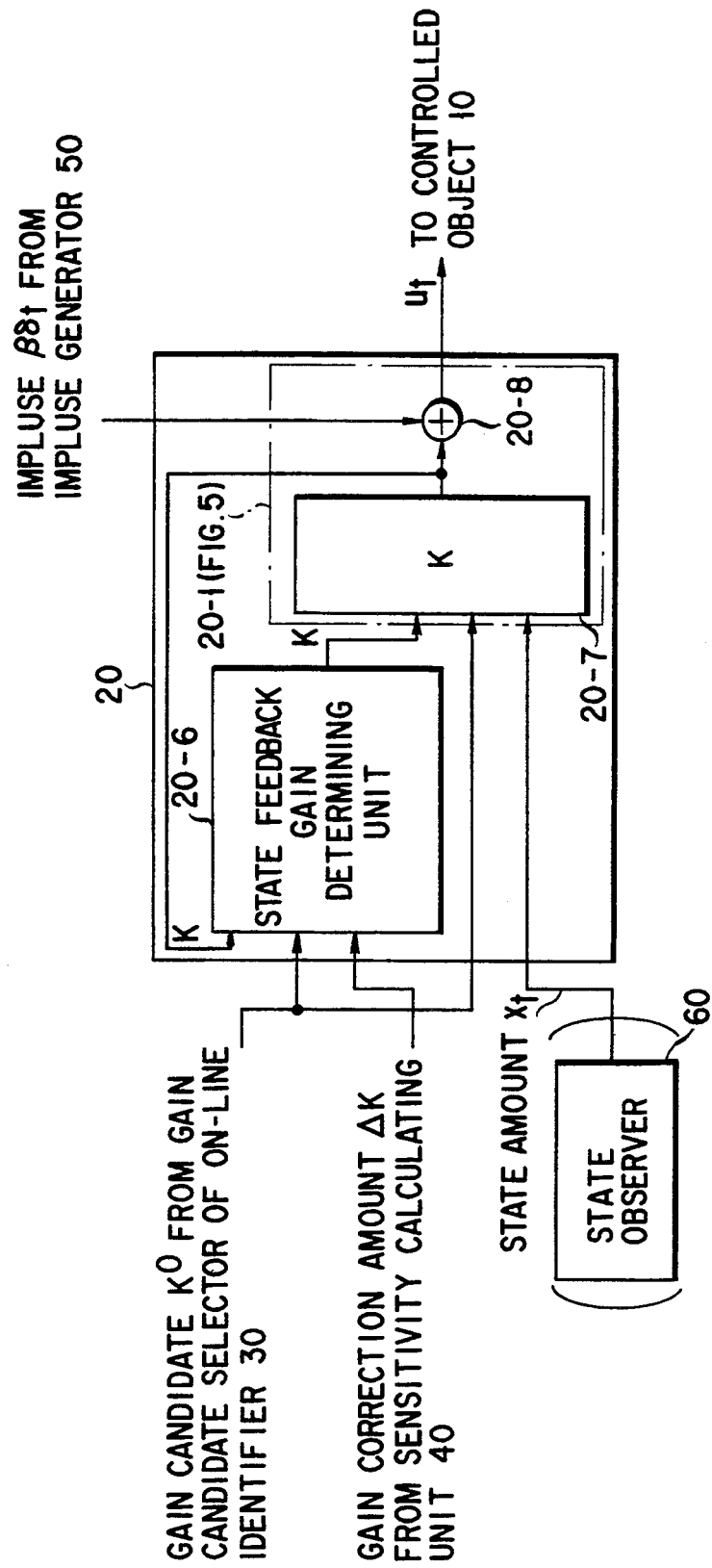
F I G. 7

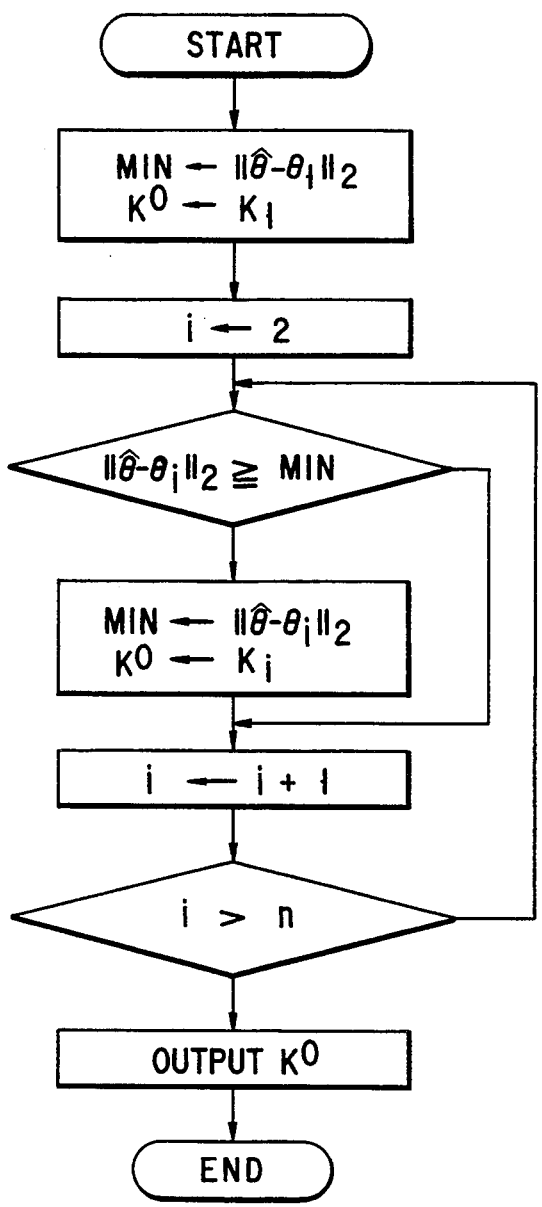
F I G. 10A
F I G. 10B

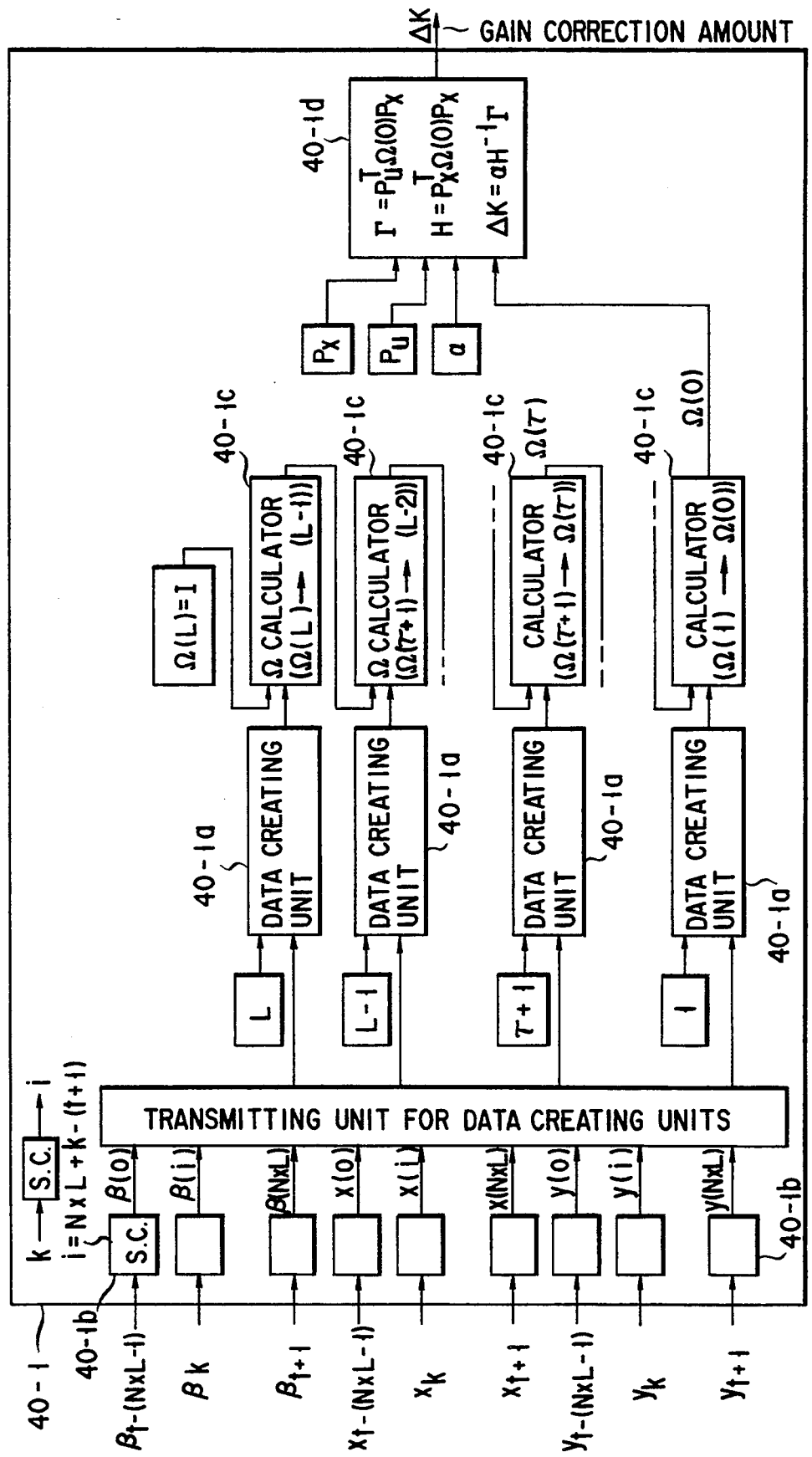
F I G. 12

ADAPTIVE CONTROL SYSTEM AND METHOD THEREOF

BACKGROUND OF THE INVENTION

1. Field of the Invention

The present invention relates to an adaptive control system and a method thereof which can be suitably used for a controlled object dynamic characteristic of which will be significantly changed.

2. Description of the Related Art

Conventionally, as an adaptive control method used for a controlled object such as a chemical plant dynamic characteristic of which will be changed with time, the following two control methods are known: (1) an adaptive control method which initializes the error covariance matrix at a proper time interval according to the on-line identifying method using as the initial value a system parameter of the controlled object which is identified on the off-line basis, or estimates the system parameter of the controlled object by means of an oblivion coefficient and then determines an optimum feedback gain according to the Ricatti equation by using the estimated parameter, and (2) an adaptive control method which directly calculates the sensitivity of the feedback gain given to the controlled object by using input/output data for the controlled object and then sequentially corrects the feedback gain given to the controlled object by means of the calculated sensitivity.

However, in the control method (1), a plurality of systems (normally, linear systems) which can be easily processed are used as models, one of the models which approximately represents the dynamic characteristic of the controlled object is selected, and an optimum feedback gain of the controlled object is determined by means of the selected model. Therefore, it is difficult to effect the adaptive control for the property which causes variation in the dynamic characteristic and which the dynamic characteristic of the controlled object has but each of the inherent models does not have. Further, the oblivion coefficient and the initialization timing for the covariance matrix in the on-line identification do not always reflect variation in the dynamic characteristic of the controlled object with time. As a result, when the control method (1) is applied to the controlled object dynamic characteristic of which significantly varies, a satisfactory control result cannot be obtained. Besides, in the control method (2), since the sensitivity of the state feedback gain can be calculated directly from the input/output data of the controlled object without effecting the system identification and therefore an optimum feedback gain can be sequentially determined by the gradient method, an adaptive control can be effected for the property inherent to the controlled object. However, the control method (2) has a defect that preliminary information concerning the controlled object such as the initial value of the feedback gain and the dimension number of the controlled object is necessary, and it is often required to effect the state estimation for a normal controlled object. That is, it is impossible to effect the control process if the identification is not effected at all. Further, when the dynamic characteristic of the controlled object is significantly changed, there occurs a problem that the follow-up ability in correction of the state feedback gain attained by sequentially calculating the state feedback gain sensitivity by use of the gradient method is low.

SUMMARY OF THE INVENTION

An object of the present invention is to provide an adaptive control system and method thereof capable of attaining the control operation of high response speed and high response precision even for a controlled object dynamic characteristic of which may significantly vary, by calculating the sensitivity of the state feedback gain by use of input/output data independently from the identification of the system parameter.

According to an aspect of the present invention, there is provided an adaptive control system comprising: means for estimating a system parameter of a controlled object system; means for providing an initial value for correction of a feedback gain by use of the estimated system parameter; means for correcting the state feedback gain by a proper initial value which causes the sensitivity of the feedback gain to be set to zero; and means for causing the estimation means to effect the estimation again when the sensitivity of the feedback gain is deviated from zero.

According to another aspect of the present invention, there is provided an adaptive control system comprising: on-line identification means for previously calculating and storing a plurality of known basic identifiers corresponding to a plurality of basic dynamic characteristics and basic state feedback gains corresponding to the basic identifiers; means for sequentially calculating the sensitivity of the selected basic state feedback gain based on the on-line input/output data for a controlled object; and control means for determining one of the basic identifiers which corresponds to the current dynamic characteristic of the controlled object based on the on-line input/output data for the controlled object by use of the on-line identification method, selecting a basic state feedback gain corresponding to the determined basic identifier, determining whether the selected basic state feedback gain is optimum based on the result of calculation of the sensitivity, and finely adjusting the selected basic state feedback gain by using the calculated sensitivity and irregularly switching the plurality of dynamic characteristics when it is determined that the selected basic state feedback gain is not optimum.

According to still another aspect of the present invention, there is provided an adaptive control system comprising: on-line identification means for receiving input data and output data of a controlled object dynamic characteristic of which changes, effecting the on-line identification and deriving an optimum state feedback gain based on an evaluation function signifying the optimality and the identified system parameter; feedback gain sensitivity calculating means for receiving the input data and output data of the controlled object and calculating the sensitivity of an optimum state feedback gain obtained by the identification means; control data calculating means for receiving output data of the controlled object, deriving a state feedback input based on the output data and an optimum feedback gain obtained by the on-line identification means and supplying the state feedback input to the controlled object as control input data; determining means for determining based on the criterion whether the sensitivity of the optimum state feedback gain derived by the feedback gain sensitivity calculating means is zero; gain adjusting means for determining that the state feedback gain is optimum when the determining means determines that the sensitivity of the state feedback gain is zero and finely adjusting the state feedback gain by use of the sensitivity when the sensitivity is determined to be near zero; and initialization instructing means for supplying an initialization instruction which initializes the covariance matrix in the on-line identification to the on-line identification means when the determining means determines that the sensitivity of the state feedback gain is significantly deviated from zero.

According to still another aspect of the present invention, there is provided an adaptive control method comprising the steps of: estimating a system parameter of a controlled object system; providing an initial value for correction of a feedback gain by use of the estimated system parameter; correcting the state feedback gain by use of a proper initial value which causes the sensitivity of the feedback gain to be set to zero; and effecting the estimation of the system parameter again when the sensitivity of the feedback gain is deviated from zero.

According to still another aspect of the present invention, there is provided an adaptive control method comprising the steps of: previously calculating and storing a plurality of known basic identifiers corresponding to a plurality of basic dynamic characteristics and basic state feedback gains corresponding to the basic identifiers; sequentially calculating the sensitivity of the selected basic state feedback gain based on the on-line input/output data for a controlled object; determining one of the basic identifiers which corresponds to the current dynamic characteristic of the controlled object based on the on-line input/output data for the controlled object by use of the on-line identification method and selecting a basic state feedback gain corresponding to the determined basic identifier; determining based on the result of calculation of the sensitivity whether the selected basic state feedback gain is optimum; and finely adjusting the selected basic state feedback gain by using the calculated sensitivity and irregularly switching the plurality of dynamic characteristics when it is determined that the selected basic state feedback gain is not optimum.

According to still another aspect of the present invention, there is provided an adaptive control method comprising the steps of: receiving input data and output data of a controlled object whose dynamic characteristic changes and determining a system parameter of the controlled object by on-line identification; supplying optimum control data to the controlled object by deriving an optimum state feedback gain based on an evaluation function signifying the optimality and the system parameter; deriving the sensitivity of the state feedback gain of the controlled object based on the on-line input data and output data of the controlled object; determining the sensitivity based on the criterion; determining that the state feedback gain is optimum when the sensitivity is determined to be zero; finely adjusting the state feedback gain by using the sensitivity when the sensitivity is determined to be near zero; and initializing the covariance matrix in the on-line identification when the sensitivity is significantly deviated from zero.

In the first embodiment of the present invention, a plurality of known basic identifiers $P_i$ corresponding to a plurality of basic dynamic characteristics and basic state feedback gains $K_i$ corresponding to the basic identifiers $P_i$ are previously calculated and stored. A basic identifier $P_0$ which is included in the plurality of basic identifiers $P_i$ and which corresponds to the current dynamic characteristic of the controlled object is determined by the on-line identification method based on on-line input/output data items $u_t, \ldots, u_{t-N-1}; y_t, \ldots, y_{t-N-1}$ (N is a desired number of data items) for the controlled object. A basic state feedback gain $K_0$ corresponding to the basic identifier $P_0$ is selected. At the same time, the sensitivity $\partial V/\partial K$ of the selected state feedback gain with respect to a preset evaluation function $V_{[0,L]}$ is sequentially calculated based on the on-line input/output data items $u_t, \ldots, u_{t-N-1}, y_t, \ldots, y_{t-N-1}$ (N is a desired number of data items). It is determined based on the calculation result of the sensitivity whether the current basic state feedback gain is optimum. The current state feedback gain is finely adjusted by use of the calculated sensitivity $\partial V/\partial K$ when it is determined that the current basic state feedback gain is not optimum.

In the second embodiment of the present invention, when the state feedback gain used for supplying control data to the controlled object is determined, a system parameter representing the current dynamic characteristic is specified by effecting the on-line identification. An optimum state feedback gain is derived based on the evaluation function signifying the optimality of the control and the system parameter and is used as the state feedback gain for the controlled object. The sensitivity of the state feedback gain is derived based on the on-line input data and on-line output data by the state feedback gain sensitivity calculation using the input/output data. The state feedback gain is determined to be optimum when the sensitivity is determined to be zero. The state feedback gain is finely adjusted by using the sensitivity when the sensitivity is determined to be near zero. The covariance matrix in the on-line identification is initialized to effect the on-line identification again when the sensitivity is determined to be significantly deviated from zero. As a result, the controlled object dynamic characteristic of which will be significantly changed can be adaptively controlled with high precision and high response speed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a block diagram showing a first embodiment of an adaptive control system of the present invention;

FIG. 7 is a block diagram showing the construction of a control section shown in FIGS. 1 and 4;

FIG. 10A is a flowchart for illustrating the operation of a gain candidate selecting unit of the on-line identifier shown in FIG. 2;

FIG. 10B is a diagram showing a parameter-gain table in the on-line identifier in FIG. 2;

FIG. 12 is a block diagram showing the construction of a gain sensitivity calculating unit shown in FIG. 11.

DETAILED DESCRIPTION OF THE PREFERRED EMBODIMENTS

Figure 2:
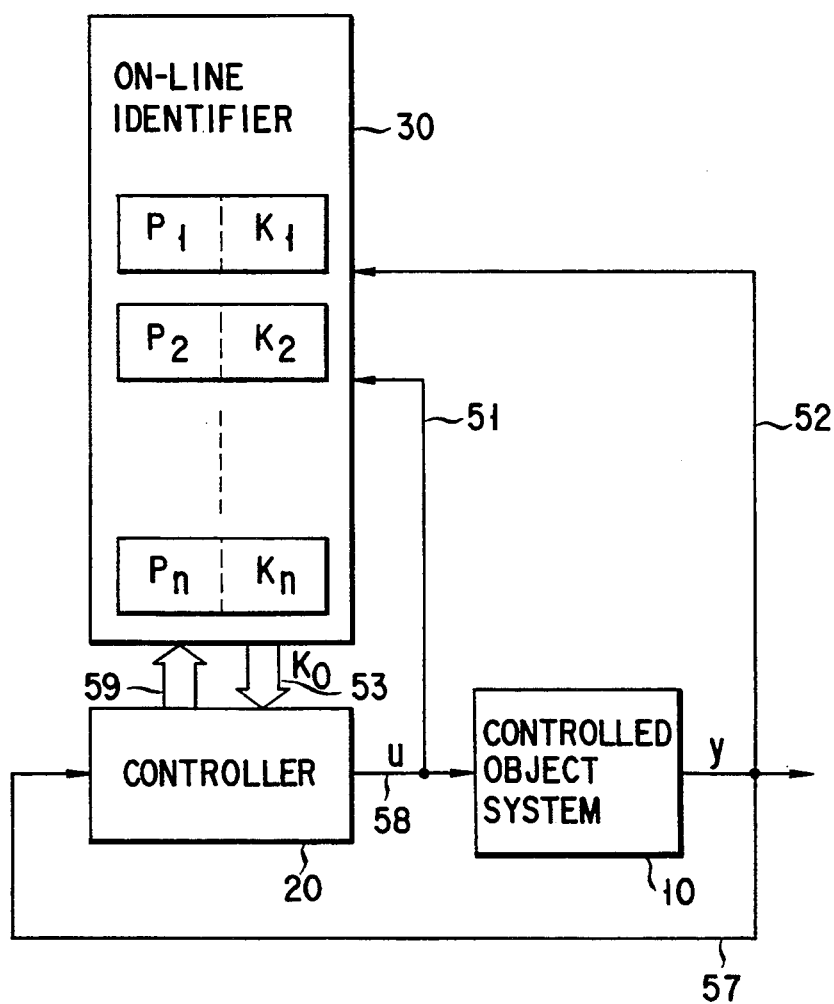
FIG. 2 is a block diagram showing a control section realized only by the on-line identifier in the first embodiment shown in FIG. 1.

There will now be described embodiments of an adaptive control system and method of the present invention in detail with reference to the accompanying drawings.

FIG. 1 is a block diagram showing a first embodiment of an adaptive control system of the present invention. The first embodiment of FIG. 1 includes an object system 10 which is a controlled object such as a plant; a controller 20 for supplying control input data u to the object system 10; an on-line identifier 30 for effecting the on-line identification of the system parameter of the object system 10 by using the control input data u and output data y of the object system 10; and a feedback gain sensitivity calculating unit 40 for calculating the sensitivity of the state feedback gain which is now given to the controller 20 by using the control input data u and output data y of the object system 10. The dynamic characteristic of the object system 10 which is a controlled object is presented by irregularly switching a plurality of basic dynamic characteristics. The controller 20 is supplied with output data y of the object system 10 via a line 57, applies an optimum feedback gain $K_0$ supplied from the identifier 30 to the output data y and supplies control input data u to the object system 10 via a line 58. Further, the controller 20 determines whether the sensitivity $\partial V/\partial K$ of the state feedback gain calculated by the feedback gain sensitivity calculating unit 40 is optimum. The controller 20 effects the fine adjustment for the optimum feedback gain $K_0$ of the on-line identifier 30 by use of a line 59 when it determines that the sensitivity $\partial V/\partial K$ is not zero. The controller 20 then supplies the control input data u to which the finely adjusted optimum feedback gain $K_0$ is applied to the object system 10. As will be described later with reference to FIG. 2, the on-line identifier 30 previously calculates and stores a plurality of known basic identifiers corresponding to a plurality of basic dynamic characteristics and basic state feedback gains corresponding to the basic identifiers. The on-line identifier 30 is supplied with the control input data u and output data y of the object system 10 via lines 51 and 52, respectively. The on-line identifier 30 effects the on-line identification of the system parameter by determining one of the basic identifiers which corresponds to the present behavior of the object system 10 by use of the control input data u and output data y. The on-line identifier 30 supplies an optimum feedback gain $K_0$ corresponding to the determined basic identifier to the controller 20 via a line 53. The feedback gain sensitivity calculating unit 40 is supplied with the control input data u and output data y of the controlled object system 10 via lines 54 and 55, respectively, calculates the sensitivity $\partial V/\partial K$ of the state feedback gain which is now given to the controller 20 by use of the control input data u and output data y, and supplies the calculated sensitivity to the controller 20 via a line 56. In this case, as will be clearly understood from the description made later, the sensitivity $\partial V/\partial K$ of the state feedback gain is calculated by use of the evaluation function $V_{[0,L]}$ signifying the optimality of the state feedback gain and is given as a variation dV in the evaluation function $V_{[0,L]}$ with respect to a variation dK in the state feedback gain.

In the first embodiment, it is assumed that the dynamic characteristic of the object system 10 can be represented by a controllable and observable one-input-/output linear system and the evaluation function $V[0,L]$ signifying the optimality of the state feedback gain K is previously given.

FIG. 2 is a block diagram showing a control section realized only by the on-line identifier 30 in the construction shown in FIG. 1. In this construction, the on-line identifier 30 is explained more in detail. As shown in FIG. 2, the on-line identifier 30 previously calculates and stores a plurality of known basic identifiers $P_1$ to $P_n$ corresponding to a plurality of basic dynamic characteristics and basic state feedback gains $K_1$ to $K_n$ corresponding to the basic identifiers $P_1$ to $P_n$. The on-line data identification is effected by determining the basic identifier $P_0$ representing the basic dynamic characteristic which determines the present behavior of the object system 10 from the basic identifiers $P_1$ to $P_n$ by use of the control input data u and output data y.

The on-line identification method is known in the art and, therefore, only the procedure of calculation is briefly explained below. In this case, the estimation of a parameter of an observable canonical model of controllable and observable one-input/output system is identified by use of a Kalman filter.

First, the controlled object 10 is expressed by the following equation (1).

$$y_t = \sum_{i=1}^{n} a_i y_{t-i} + \sum_{j=1}^{n} b_j u_{t-j} + \mu_t \qquad (1)$$

where $u_t$ indicates input data of the controlled object 10, $y_t$ indicates output data of the controlled object 10, $\mu_t$ indicates Gaussian white noise, and $a_i$ and $b_j$ indicate system parameters. Assume now that the following equation (2) is established.

$$\theta = (a_i, \ldots a_n, b_i, \ldots b_n)^T \ (2n \times 1) \qquad (2)$$
$$\phi_t = (y_{t-1}, \ldots y_{t-n}, u_{t-1}, \ldots, u_{t-n}) \ (1 \times 2n)$$

Then, the equation (1) can be rewritten as follows.

$$y_t = \phi_t \theta_t + \mu_t \qquad (3)$$

$$\theta_{t+1} = \theta_t \qquad (4)$$

$$\theta_0 = \theta \qquad (5)$$

when the Kalman filter is applied to the system as the on-line identification algorithm, the following equations can be obtained.

$$\hat{\theta}_t = \hat{\theta}_{t-1} + K_t(y_t - \phi_t \hat{\theta}_{t-1}) \quad (6)$$

$$\hat{\theta}_0 = 0 \quad (7)$$

$$K_t = \frac{\psi_{t-1}\phi_t^T}{R + \phi_t\psi_{t-1}\phi_t^T} = \frac{\psi_t\phi_t^T}{R} \quad (8)$$

$$\psi_t = \psi_{t-1} - \frac{\psi_{t-1}\phi_t^T \phi_t \psi_{t-1}}{R + \phi_t \psi_{t-1}\phi_t^T} \quad (9)$$

$$\psi_0 = cov\{\theta\} \quad (10)$$

where $$\hat{\theta}_t = E\{\theta | X_t\}$$

$$\psi_t = E\{(\theta - \hat{\theta}_t)(\theta - \hat{\theta}_t)^T\}$$

E indicates an expected value and cov indicates a covariance matrix. $\psi_t$ indicates an error covariance matrix. Further, a superscript T indicates a transposed matrix. The estimated value of the sequential parameter can be derived and current system parameters ($a_1, \ldots, a_n, b_1, \ldots, b_n$) of the object system can be estimated by the above method. In the on-line identifier 30, the on-line identification is effected by determining the basic identifier $P_0$ exhibiting a basic dynamic characteristic which determines the current behavior of the object system 10 from the plurality of basic identifiers $P_1$ to $P_n$ based on the estimated current system parameters ($a_1, \ldots, a_n, b_1, \ldots, b_n$). An optimum feedback gain $K_0$ corresponding to the thus identified basic identifier $P_0$ is supplied to the controller 20 via the line 53.

Next, the feedback gain sensitivity calculating unit 40 in FIG. 1 is explained more in detail. A method of calculating the sensitivity of the state feedback gain for the quadratic form evaluation function based on the input/output data is proposed. The feedback gain sensitivity calculating unit 40 derives the primary sensitivity $\partial V / \partial K$ and secondary sensitivity $\partial^2 V / \partial K^2$ for the evaluation function $V_{[0,L]}$ of the state feedback gain K based on the input/output data of the controlled object 10, and sequentially effects the adjustment to attain an optimum state feedback gain by the gradient method. In this case, the feature lies in that the sensitivities $\partial V / \partial K$ and $\partial^2 V / \partial K^2$ of the state feedback gain K are derived by processing the input/output data of the controlled object 10. Therefore, the operation is mainly explained and then a method of supplying input/output data of the actual controlled object 10 to the feedback gain sensitivity calculating unit 40 is explained.

First, the operation of deriving the sensitivities $\partial V / \partial K$ and $\partial^2 V / \partial K^2$ of the state feedback gain K is explained. A system expressed by the following equation (11) is considered as a model system.

$$x_{t+1} = Ax_t + Bu_t \quad (11)$$

where $x_t \in R^n$ indicates the state data of the controlled object and $u_t \in R^m$ indicates input data of the controlled object. In this case, the total cost (evaluation function) on the finite segment [0, L] is expressed by the following equation (12).

$$V_{[0,L]} = \sum_{t=0}^{L} \{x(t)^T Q x(t) + u(t)^T R u(t)\} \quad (12)$$

Next, the following variable is introduced.

$$z(t) = \begin{bmatrix} Q^{\frac{1}{2}} x(t) \\ R^{\frac{1}{2}} u(t) \end{bmatrix} \quad (13)$$

where $(Q)^{\frac{1}{2}}$ and $(R)^{\frac{1}{2}}$ are symmetrical square-root matrices with respect to the non-negative constant matrix. When the entire portion of a signal z(t) on the observation segment [0, L] is expressed by $z_{[0,L]}$, the inner product of the signal $z_{[0,L]}$ and a different signal $z'_{[0,L]}$ on the same observation segment can be defined as follows.

$$(z_{[0,L]}, z'_{[0,L]}) = \sum_{t=0}^{L} z(t)^T z'(t) \quad (14)$$

$$= \sum_{t=0}^{L} \{X(t)^T Q x'(t) + u(t)^T R u'(t)\}$$

When $z_{[0,L]} = z'_{[0,L]}$, $V_{[0,L]} = (z_{[0,L]}, z'_{[0,L]})$. An optimum feedback gain for setting the cost $V_{[0,L]}$ to the minimum value can be attained in the system expressed by the equation (11). In this example, a case wherein the state feedback gain K which is not optimum is sequentially set closer to the optimum gain is considered.

Assume that a unit impulse input whose value is set to "1" only at the time $t = 0$ is $\delta_0$ and a state feedback input with additional impulse expressed by the following equation is used as $$u(t) = K_k x(t) + \beta \delta_0 \quad (15)$$

Further, a response signal obtained when the initial state $x(0)$ is $\alpha \in R^n$ is expressed by $z_{[0,L]}$ ($\alpha$, $\beta$, $K_k$). In the k-th step of the calculation procedure, $n_k$ initial value responses and $m_k$ impulse responses with respect to the feedback system are observed. Vectors $K_i(i=1, \ldots, n_k)$ and $K_j(j=1, \ldots, m_k)$ may take the dimensions of $R^n$ and $R^m$. Then, assume that the following equations (16) and (17) are set up.

$$z_{ki}^a = z_{[0,L]}(\alpha_{ki}, 0, K_k), \; i=1, \ldots, n_k \quad (16)$$

$$z_{ki}^b = z_{[0,L]}(0, \beta_{kj}, K_k), \; i=1, \ldots, m_k \quad (17)$$

After this, the $n \times m$ matrix $\Gamma_k$ and the $m \times m$ matrix $H_k$ expressed by the following equations (18) and (19) are calculated based on the above signals.

$$\Gamma_k = \{\Sigma_k^a\}^{-1} \left\{ \sum_{i=1}^{n_k} \sum_{j=1}^{m_k} \alpha_{ki}(z_{ki}^a, z_{kj}^b)\beta_{kj}^T \right\} \{\Sigma_k^a\}^{-1} \quad (18)$$

$$H_k = \{\Sigma_k^b\}^{-1} \left\{ \sum_{i=1}^{m_k} \sum_{j=1}^{m_k} \beta_{ki}(z_{ki}^b, z_{kj}^b)\beta_{kj}^T \right\} \{\Sigma_k^b\}^{-1} \quad (19)$$

where

-continued $$\Sigma_k^a = \sum_{i=1}^{n_k} \alpha_{ki} \alpha_{ki}^T \qquad (20)$$

$$\Sigma_k^b = \sum_{i=1}^{m_x} \beta_{ki} \beta_{ki}^T \qquad (21)$$

At this time, as shown in the following equation (22) or (23), when an initial gain $K_{init}$ is given in the controller 20, a feedback gain series can be sequentially derived by use of the equation (22) or (23) without obtaining the state equation. The feedback gain K is corrected and sequentially set closer to the optimum feedback gain K. $\alpha$ is a positive scalar.

$$K_{k+1} = K_k - \alpha \{H_k\}^{-1} \{\Gamma_K\}^T \qquad (22)$$

$$K_{k+1} = K_k - \alpha \{\Gamma_k\}^T \qquad (23)$$

The equation (23) is related only to the primary sensitivity function $\Gamma$ and is not related to the secondary sensitivity function H.

Next, a method of supplying input/output data of the controlled object 10 to the feedback gain sensitivity calculating unit 40 in FIG. 1 is described. Various methods of supplying the input/output data to the feedback gain sensitivity calculating unit 40 are considered. However, in this example, it is assumed that the input/output data is given according to the following calculation procedure. First, the observation period is set to L and the number of data items is set to N. Then, the matrices $\Omega$ and H described before, i.e., the sensitivities $\partial V/\partial K$ and $\partial^2 V/\partial k^2$ of the state feedback gain calculated by the feedback gain sensitivity calculating unit 40 are calculated by the sequential equation of the matrix $\Omega(\tau)$ as follows.

$$\Omega(\tau) = \Sigma_s^{-1}(\tau) \left[ \sum_{i=1}^{N} \sum_{j=1}^{N} s_i(\tau) \{y_i^T(\tau) + X_i^T(\tau+1) P_x^T \Omega(\tau+1) P_x x_j(\tau+1)\} s_j(\tau) \right] \Sigma_s^{-1}(\tau) \qquad (24)$$

$$y_i(\tau) = z_{[0,L]}(x_i(\tau), \Delta u_i(\tau), k) \qquad (25)$$

$$s_i(\tau) = \begin{bmatrix} x_i(\tau) \\ \Delta u_i(\tau) \end{bmatrix} \qquad (26)$$

$$\Sigma_s(\tau) = \sum_{i=1}^{N} s_i(\tau) s_i(\tau)^T \qquad (27)$$

$$P_x = \begin{bmatrix} I_n \\ O_{m \times n} \end{bmatrix} \qquad (28)$$

$$P_u = \begin{bmatrix} O_{n \times m} \\ I_m \end{bmatrix} \qquad (29)$$

$$\Gamma = P_x^T \Omega(0) P_u \qquad (30)$$

$$H = P_u^T \Omega(0) P_u \qquad (31)$$

where $\tau = L-1, \ldots, 0$; $i, j = 1, \ldots, N$; $\Omega(L) = I_{nm}$.
At this time, $x_i(\tau)$ and $\Delta u_i(\tau)$ are defined as follows.

$$X_i(\tau) = x(\tau - 1 + i) \qquad (32)$$

$$\Delta u_i(\tau) = \sum_{\tau=1}^{i} \Delta K(\tau - 1 + i) x(\tau - 1 + i) \qquad (33)$$

Figure 3:
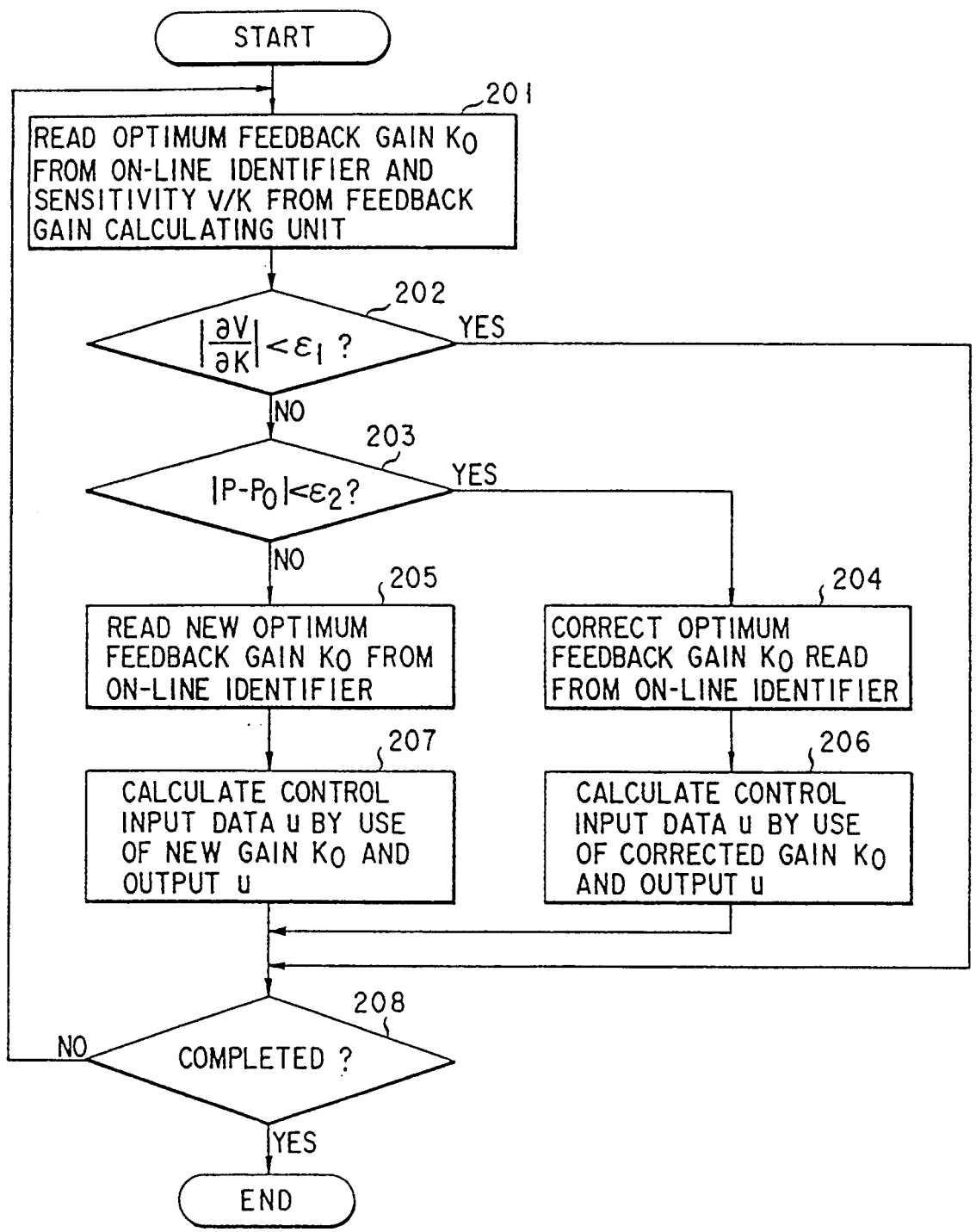
FIG. 3 is a flowchart for illustrating the operation of the first embodiment shown in FIG. 1.

Next, the operation of the controller 20 of the first embodiment is explained with reference to the flowchart shown in FIG. 3. First, the controller 20 reads the optimum feedback gain $K_0$ calculated by the on-line identifier 30 and the sensitivity $\partial V/\partial K$ of the state feedback gain calculated by the feedback gain sensitivity calculating unit 40 (step 201). Next, the controller 20 determines whether the absolute value of the sensitivity $\partial V/\partial K$ calculated by the feedback gain sensitivity calculating unit 40 is smaller than $\epsilon_1$ (step 202). If it is determined that the absolute value of the sensitivity $\partial V/\partial K$ calculated by the feedback gain sensitivity calculating unit 40 is smaller than $\epsilon_1$, the controller 20 uses the optimum feedback gain $K_0$ calculated by the on-line identifier 30 as it is. The controller 20 derives control input data u for the object system 10 by applying the optimum feedback gain $K_0$ supplied from the on-line identifier 30 to the output data y of the object system 10 input via the line 57. The controller 20 then supplies the derived control input data to the object system 10 via the line 57. Then, it is determined whether the control operation is completed (step 208). On the other hand, if it is determined in the step 202 that the absolute value $\partial V/\partial K$ of the sensitivity $\partial V/\partial K$ calculated by the feedback gain sensitivity calculating unit 40 is larger than $\epsilon_1$, it is then determined whether the system parameter $\theta$ corresponding to the current state feedback gain K coincides with the system parameter $\theta$ derived by the on-line identifier 30. That is, it is determined whether the absolute value of $P - P_0$ is smaller than $\epsilon_2$ (step 203). $\epsilon_1$ and $\epsilon_2$ are predetermined errors. If it is determined that the absolute value of $P - P_0$ is smaller than $\epsilon_2$, the optimum feedback gain $K_0$ supplied from the on-line identifier 30 is corrected (step 204). Correction of the optimum feedback gain $K_0$ is effected according to the equation (22). The controller 20 derives control input data for the object system 10 by use of the corrected optimum feedback gain $K_0$, and supplies the derived control input data to the object system 10 via the line 57 (step 206). Further, if it is determined in the step 203 that the absolute value of $P - P_0$ is larger than $\epsilon_2$, that is, if the state feedback gain calculated by the feedback gain sensitivity calculating unit 40 is not optimum and the system parameter $\theta$ corresponding to the current state feedback gain K does not coincide with the system parameter $\theta$ derived by the on-line identifier 30, the controller 20 causes the on-line identifier 30 to effect the new identification via the line 59, and reads a new optimum feedback gain $K_0$ obtained by the identification from the on-line identifier 30 (step 205). The controller 20 applies the new optimum feedback gain $K_0$ to derive control input data u for the object system 10, and supplies the control input data u to the object system 10 via the line 57 (step 207). Next, it is determined whether the control operation is completed (step 208). If it is determined that the control operation is not completed, the step 201 is effected to repeat the above process. If it is determined that the control operation is completed, this process is completed.

Thus, according to the first embodiment, since the optimum feedback gain $K_0$ is derived by the system identification method by use of the on-line identifier 30 and supplied to the controller 20 and, at the same time, the optimum feedback gain $K_0$ derived by the on-line identifier 30 is finely adjusted according to the sensitivity $\partial V/\partial K$ of the state feedback gain calculated by the feedback gain sensitivity calculating unit 40, a preferable control characteristic which is excellent in the response speed and precision can be attained even when the present invention is applied to the object system dynamic characteristic of which is significantly changed. In the one-input series observable canonical system, the state x of the object system is uniformly represented in the input series and output series. Various applications of the gain adjustment of the object system can be considered by changing the method of supplying the input/output data. Also, it can be applied to a non-linear system which can be partially represented by a linear system. Further, if the identification method which permits the non-linear function to be easily dealt with is provided, it becomes possible to calculate the gain sensitivity with respect to the non-linear state feedback function and therefore application to the control of the adaptive non-linear system can be considered.

Figure 4:
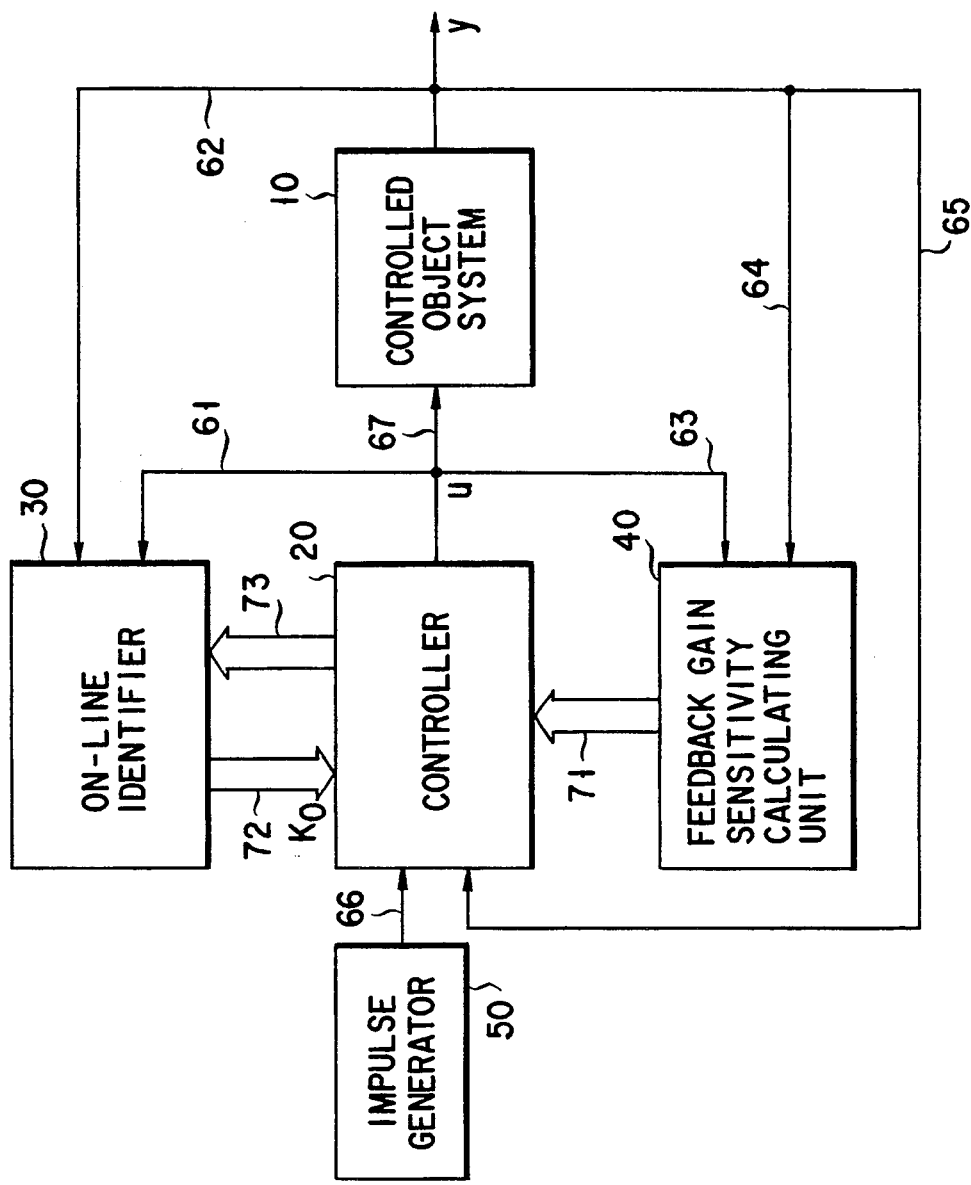
FIG. 4 is a block diagram showing a second embodiment of an adaptive control system of the present invention.

FIG. 4 is a block diagram showing a second embodiment of an adaptive control system according to the present invention. The control system shown in FIG. 4 includes an object system 10 such as a chemical plant dynamic characteristic of which varies with time; a controller 20 for supplying control input data u to the object system 10; an on-line identifier 30 for effecting the on-line identification of the object system 10 by using the control input data u and output data y of the object system 10; a feedback gain sensitivity calculating unit 40 for calculating the sensitivity of the state feedback gain which is now given to the controller 20 by using the control input data u and output data y of the object system 10; and an impulse generator 50 for generating an impulse supplied to the state feedback input for identification effected according to the state feedback gain given to the controller 20 and an impulse for calculation of the state feedback gain sensitivity.

Figure 5:
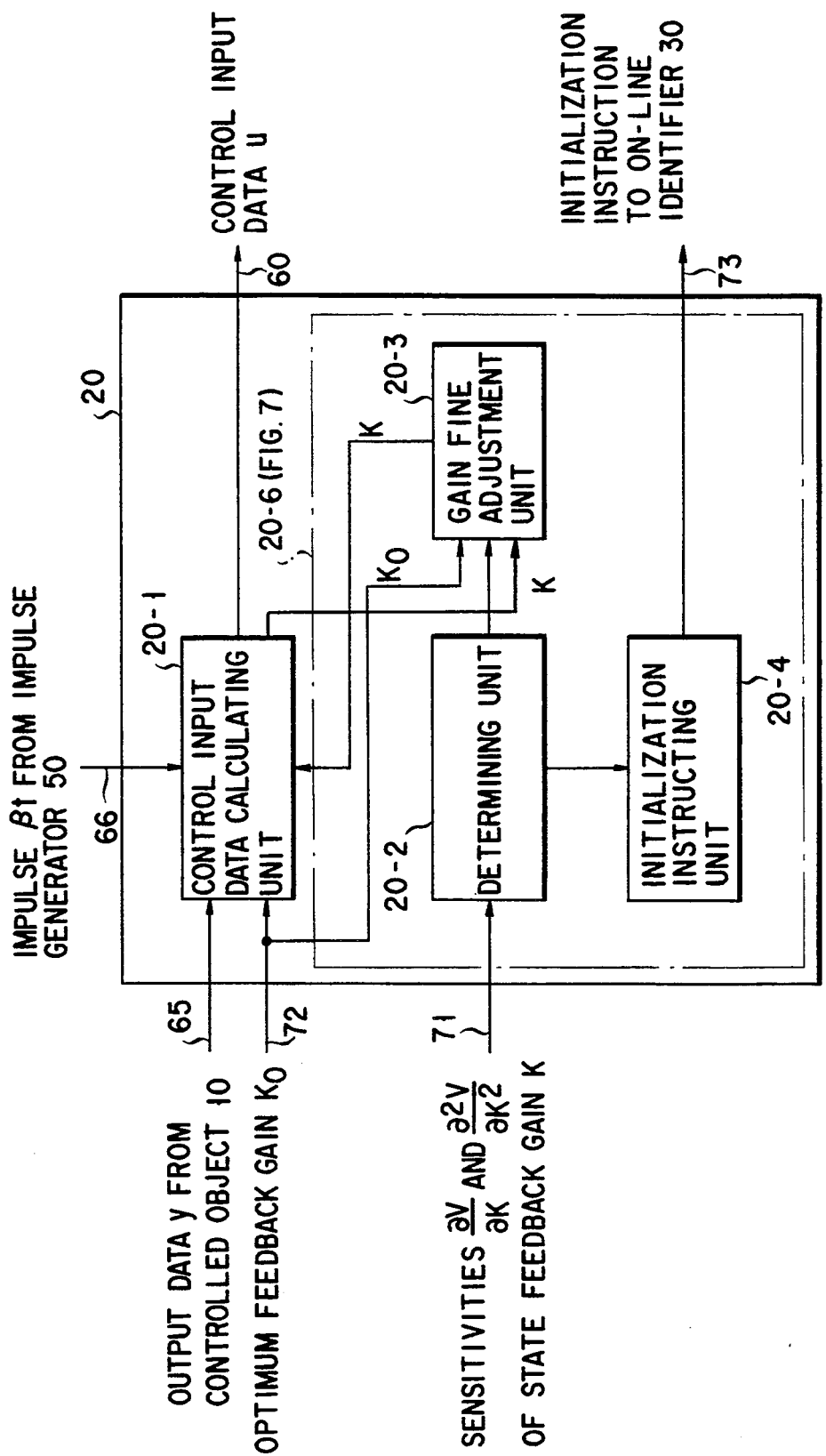
FIG. 5 is a functional block diagram showing a controller in the second embodiment shown in FIG. 4.

As shown in FIG. 5, the controller 20 includes a control data calculating unit 20-1, a determining unit 20-2, a gain fine adjustment unit 20-3, and an initialization instructing unit 20-4. The determining unit 20-2, the gain fine adjustment unit 20-3 and the initialization unit 20-4 correspond to a gain determining unit 20-6 in FIG. 7. The control data calculating unit 20-1 is supplied with output data y of the controlled object 10 via a line 65, derives a state feedback input by applying the state feedback gain K supplied from the identifier 30 via a line 72 to the output data y, calculates control input data u for the controlled object 10 in response to impulses $\theta_t$ for identification and calculation of the state feedback sensitivity supplied from the impulse generator 50 via a line 66, and supplies the control input data u to the controlled object 10 via a line 60. The determining unit 20-2 is supplied with the sensitivity $\partial V/\partial K$ of the state feedback gain calculated by the feedback gain sensitivity calculating unit 40, and determines based on the criterion whether the sensitivity is zero. The gain fine adjustment unit 20-3 receives the state feedback gain supplied to the control data calculating unit 20-1 from the on-line identifier 30, effects the fine adjustment of the state feedback gain by use of the sensitivities $\partial V/\partial K$ and $\partial^2 V/\partial K^2$, and outputs an adjusted state feedback gain K to the control data calculating unit 20-1 when the determining unit 20-2 determines that the sensitivity $\partial V/\partial K$ is not zero but is set to be near zero. The initialization instructing unit 20-4 supplies an instruction for effecting the initialization of the error covariance matrix in the on-line identification to the on-line identifier 30 via a line 73 when the determining unit 20-2 determines that the sensitivity $\partial V/\partial K$ is greatly deviated from zero. When the state feedback gain is finely adjusted by the gain fine adjustment unit 20-3, the state feedback input u derived by the control data calculating unit 20-1 is supplied to the controlled object 10 in response to the impulses for identification and calculation of the state feedback sensitivity supplied from the impulse generator 50 via the line 66. The on-line identifier 30 receives control input data u and output data y of the controlled object 10 via lines 61 and 62, respectively, effects the on-line identification of the system parameter of the controlled object 10 based on the control input data u and output data y by using a Kalman filter as the on-line identification algorithm, and supplies an optimum feedback gain $K_0$ corresponding to the identified system parameter as the state feedback gain K to the controller 20 via a line 72. The on-line identification is explained in the first embodiment, and therefore, the explanation therefor is omitted. The feedback gain sensitivity calculating unit 40 receives control input data u and output data y of the controlled object 10 via lines 63 and 64, respectively, calculates the sensitivities $\partial V/\partial K$ and $\partial^2 V/\partial K^2$ of the state feedback gain which is now given to the controller 20 by using the control input data u and output data y, and supplies the sensitivities to the controller 20 via a line 71. The sensitivity $\partial V/\partial K$ of the state feedback gain is given as a variation in the evaluation function $V_{[0,L]}$ with respect to a variation in the state feedback gain K as is explained in the first embodiment.

Also, in the second embodiment, it is assumed that the dynamic characteristic of the controlled object 10 is represented by a controllable and observable one-input/output linear system and the evaluation function $V_{[0,L]}$ signifying the optimality of the state feedback gain K is previously given.

Next, the method of supplying the input/output data of the controlled object 10 to the feedback gain sensitivity calculating unit 40 is explained. Various methods of supplying the input/output data to the feedback gain sensitivity calculating unit 40 may be considered. However, in this case, it is assumed that the input/output data is given by the following calculation procedure. Assume now that the observation segment is divided into blocks, the observation segment of a k-th block is $L_k$, and the number of data items is $N_k$. Normally, $L_k$ is a linearly increasing function. The matrices $\Gamma$ and H described before, that is, the sensitivities $\partial V/\partial K$ and $\partial^2 V/\partial K^2$ of the state feedback gain calculated by the feedback gain sensitivity calculating unit 40 are calculated by the sequential equation of the matrix $\zeta_t$ as follows.

As shown by the following equation (34), in the controller 20, an impulse $\zeta_t$ which is generated from the impulse generator 50 is supplied via the line 66 in response to a state feedback input derived from the state feedback gain.

$$u_t = K_k x_t + \zeta_t \quad (34)$$

It is assumed that $\zeta_t$ contains the Gaussian white noise. At this time the sensitivity matrices $\Gamma(=\partial V/\partial K)$ and $H(=\partial^2 V/\partial K^2)$ are calculated by use of the sequential equation of the matrix $\Omega_k$ as follows.

$$\Omega_{k+1} = \Sigma_{K,s1}^{-1} \left[ \sum_{i=T_k}^{T_k + \frac{N_k}{2}} \sum_{i=T_k + \frac{N_k}{2}}^{T_{k+1}^{-1}} S_i \{x_i^T x_j + x_{i+1}^T P_x^T \Omega_k P_x x_{j+1}\} S_j \right] \Sigma_{k,\tau 2}^{-1} \quad (35)$$

$$S_i = \begin{bmatrix} x_i \\ \xi_i \end{bmatrix} \quad (36)$$

$$\Sigma_{k,s1} = \sum_{i=T_k}^{T_k + \frac{N_k}{2}} S_i S_i^T \quad (37)$$

$$\Sigma_{k,s2} = \sum_{i=T_k + \frac{N_k}{2}}^{T_{k+1}^{-1}} S_i S_i^T \quad (38)$$

$$P_x = \begin{bmatrix} I_1 \\ 0_{1\times 1} \end{bmatrix} \quad (39)$$

$$P_u = \begin{bmatrix} 0_{1\times 1} \\ I_1 \end{bmatrix} \quad (40)$$

$$\Gamma_k = P_x^T \Omega_k P_u \quad (41)$$

$$H_k = P_u^T \Omega_k P_u \quad (42)$$

The observation period is divided into block units and the gain sensitivity calculation is effected for each block unit. That is, in the k-th block, the observation of $N_k = k+2$ is started at a time $T_k = \Sigma^k_{t=0} N_{t-1}$. When the gain is changed by a large amount, the block is initialized. That is, k is set to 1.

Figure 6:
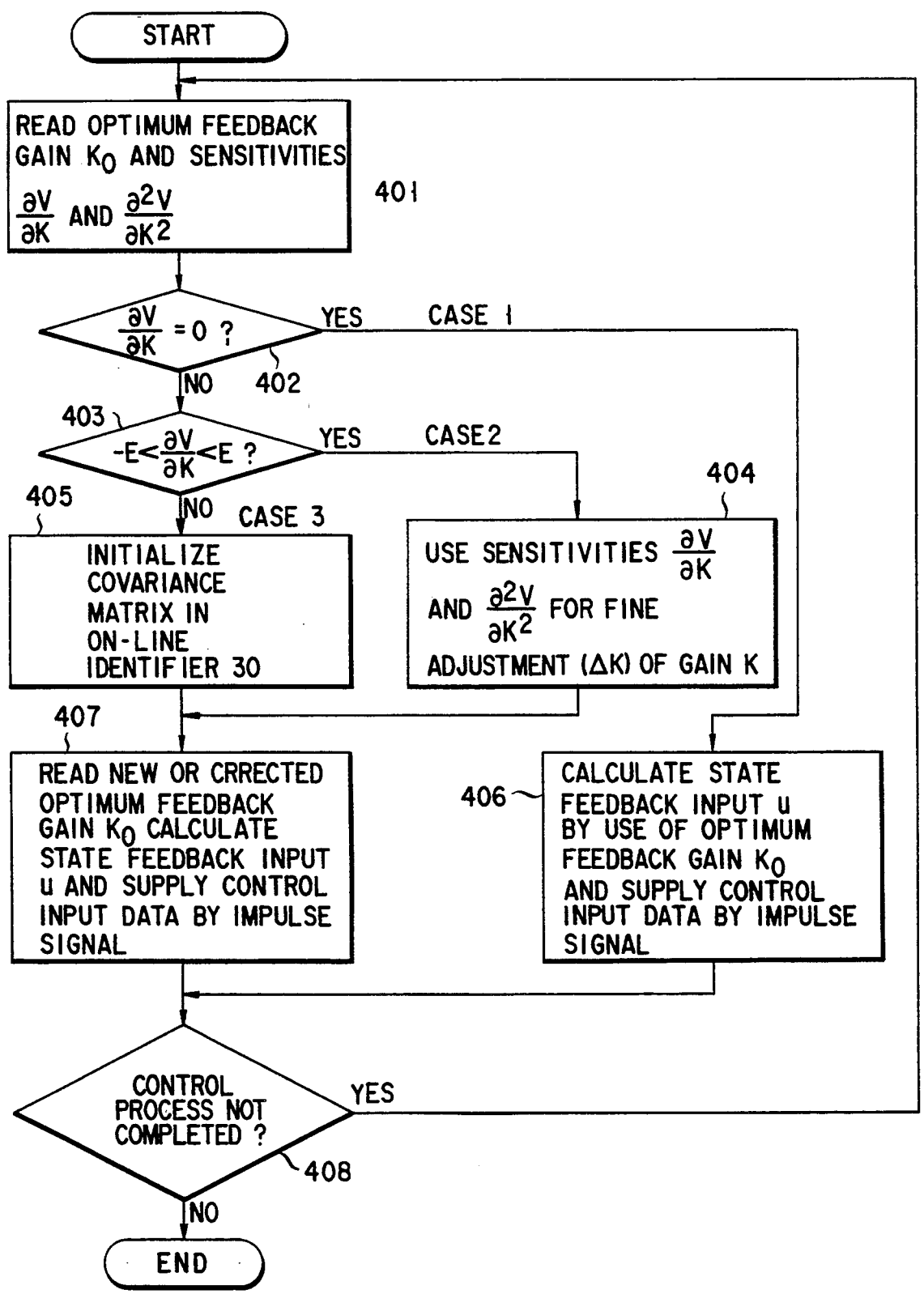
FIG. 6 is a flowchart for illustrating the operation of the second embodiment shown in FIG. 4.

Next, the operation of the controller of the second embodiment is explained with reference to the flowchart shown in FIG. 6. First, the controller 20 reads the optimum feedback gain $K_0$ calculated by the on-line identifier 30 and the sensitivities $\partial V/\partial K$ and $\partial^2 V/\partial K^2$ of the state feedback gain calculated by the feedback gain sensitivity calculating unit 40 (step 401). Then, the controller 20 determines whether the state feedback gain K calculated by the feedback gain sensitivity calculating unit 40 is optimum, that is, whether the sensitivity $\partial V/\partial K = 0$ (step 402). If it is determined that the sensitivity $\partial V/\partial K$ of the state feedback gain calculated by the feedback gain sensitivity calculating unit 40 is zero, the controller 20 uses the optimum feedback gain $K_0$ calculated by the on-line identifier 30 to derive a state feedback input, derives control input data u for the controlled object 10 in response to signals for identification and calculation of the state feedback sensitivity supplied from the impulse generator 50 via the line 66, and supplies the control input data u to the controlled object 10 via the line 67 (step 406). Next, the control process goes to the step 408. On the other hand, if it is determined in the step 402 that the sensitivity $\partial V/\partial K$ of the state feedback gain calculated by the feedback gain sensitivity calculating unit 40 is not zero, it is determined whether the sensitivity is set to be near zero. That is, it is determined whether the sensitivity $\partial V/\partial K$ is set in the range of $-E < \partial V/\partial K < E$ (step 403). E is a matrix norm. The norm is generally given by $$\|A\|_p = \max_{x \neq 0} \frac{\|Ax\|_p}{\|x\|_p}$$

and the vector norm is given by $$\|x\|_p = \left( \sum_{i=1}^{n} |X_i|^p \right)^{1/p}.$$

If it is determined that the sensitivity $\partial V/\partial K$ is set near zero, correction of the state feedback gain K obtained from the on-line identifier 30 is effected by an amount $\Delta K$ (step 404). The correction of the state feedback gain K is effected according to the equation (22) or (23) by use of the following equations.

$$\Delta K = -\alpha \{H_k\}^{-1} \{\Gamma_k\}^T$$

$$\Delta K = -\alpha \{\Gamma_k\}^T$$

On the other hand, when it is determined in the step 403 that the sensitivity $\partial V/\partial K$ is greatly deviated from zero, i.e., the sensitivity $\partial V/\partial K$ of the state feedback gain calculated by the feedback gain sensitivity calculating unit 40 is not zero and lies outside the range of the matrix norm E, an instruction for initializing the error covariance matrix in the on-line identification by the on-line identifier 30 is supplied to the line 73 to initialize the error covariance matrix in the on-line identifier 30 (step 405). After this, the controller waits for new identification and reads a new optimum feedback gain $K_0$ by the new identification from the on-line identifier 30, derives a state feedback input based on the new state feedback gain K, derives control input data u for the controlled object 10 in response to impulses for identification and calculation of the state feedback sensitivity supplied from the impulse generator 50 via the line 66, and supplies the control input data u to the controlled object 10 via the line 67 (step 407). Next, it is determined whether the control process is completed (step 408). When it is determined that the control process is not completed, the step 401 is effected again. After this, the above operation is repeated. When it is determined that the control process is completed, the control process is completed.

Thus, according to the second embodiment, since the optimum feedback gain $K_0$ is derived by the system identification method by use of the on-line identifier 30 and supplied to the controller 20, and at the same time, the timing for initialization of the error covariance matrix in the on-line identification is determined or the optimum feedback gain $K_0$ derived by the on-line identifier 30 is finely adjusted according to the sensitivities $\partial V/\partial K$ and $\partial^2 V/\partial K^2$ of the state feedback gain calculated by the feedback gain sensitivity calculating unit 40, a preferable control characteristic which is excellent in the response speed and precision can be attained. In the one-input/output series observable canonical system, the state of the controlled object 10 is uniformly represented in the input series and output series. Further, various applications of the gain adjustment can be considered by changing the method of supplying the input/output data. Also, it can be applied to a non-linear system which can be partially represented by a linear system. Further, if the identification method which permits the non-linear function to be easily dealt with is provided, it becomes possible to calculate the gain sensitivity $\partial V/\partial K$ with respect to the non-linear state feedback function and therefore application to the control of the adaptive non-linear system can be considered.

Next, the embodiments of the present invention are further described with reference to FIGS. 7 to 13.

FIG. 7 is a block diagram showing the construction of the controller 20 shown in FIGS. 1 and 4. The controller 20 includes a gain determining unit 20-6, state feedback gain unit 20-7, and adder 20-8. The state feedback gain unit 20-7 and the adder 20-8 correspond to the control data calculating unit 20-1 in FIG. 5. The controller 20 outputs control input data $u_t$ for the controlled object 10 according to an optimum gain candidate $K^0$ (which will be described later with reference to FIGS. 9 and 10) from a gain candidate selecting unit 30-2 of the on-line identifier 30, a gain correction amount $\Delta K$ from the sensitivity calculating unit 40, a state $x_t$ from a state observer 60, and an impulse signal $\beta\delta_t$ (only in the second embodiment) from the impulse generator 50. When the state of the controlled object 10 is obtained as observation data, the state $x_t$ is used. In this case, the state observer 60 is not used. However, when the state $x_t$ of the controlled object 10 is not obtained actually as observation data, the output $x_t$ from the state observer 60 is used and the state estimation value thereof is used as the state $x_t$. The state observer 60 is realized by using parameters $\hat{\theta}_t$ and $\phi_t$ of the Kalman filter for the on-line identification to construct another Kalman filter, and outputs a state estimation value $x_t$ from which the state can be estimated.

Figure 8:
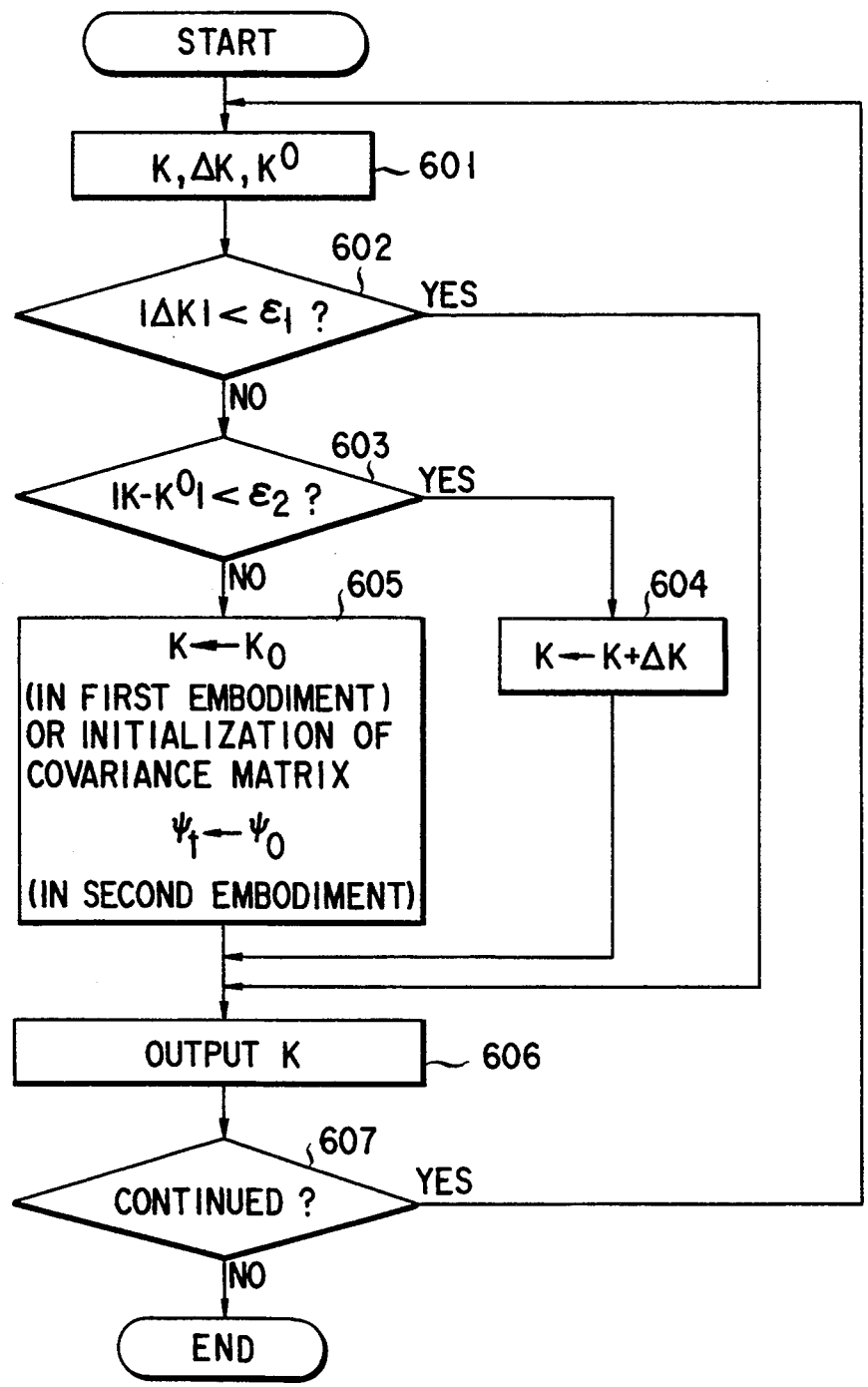
FIG. 8 is a flowchart for illustrating the operation of a gain determining unit shown in FIG. 7.

FIG. 8 is a flowchart for illustrating the operation of the gain determining unit 20-6 shown in FIG. 7. The state feedback gain determining unit 20-6 uses a gain K now given to the controller 20, an input $K^0$ as a gain candidate, and an input $\Delta K$ from the sensitivity calculating unit 40 to determine a new gain K (step 601). It is determined whether the matrix norm of the gain correction amount $\Delta K$ is smaller than $\epsilon_1$ or not (step 602). When the matrix norm of $\Delta K$ is smaller than $\epsilon_1$, the gain K is kept as it is. When the matrix norm of $\Delta K$ is larger than $\epsilon_1$, it is determined whether the matrix norm of $(K-K^0)$ is smaller or larger than $\epsilon_2$ (step 603). When the matrix norm of $(K-K^0)$ is smaller than $\epsilon_2$, the gain K is corrected by use of $\Delta K$. That is, the gain K is set to $K+\Delta K$ (step 604). On the other hand, when the matrix norm of $(K-K^0)$ is larger than $\epsilon_2$, in the case of the first embodiment, the second best gain candidate $K_0$ corresponding to the estimated parameter $\hat{\theta}_t$ is sequentially selected from the gain candidate selecting unit 30-2 and used as K (step 605). While, in the case of the second embodiment, it is determined that the estimated parameter $\hat{\theta}_t$ is not correct, and the error covariance matrix is initialized. That is, the error covariance matrix $\psi_t$ is set to the initial value $\psi_0$ (step 605). The gain K may be changed to a proper value or may be kept unchanged, and will not be specified. After the gain K is thus determined and outputted (step 606), whether it is determined the determining process is continued (step 607). This is because it is necessary to collect data for a certain period of time after the covariance matrix $\psi_t$ is initialized, for example. An input $u_t$ is calculated according to the equation $u_t = Kx_t + \beta\delta_t$ by use of the thus determined gain K, the state $x_t$ and the impulse signal $\beta\delta_t$ for identification and calculation of the sensitivity. The state feedback gain unit 20-7 in FIG. 7 calculated $Kx_t$, and the adder 20-8 calculates $\beta\delta_t$.

Figure 9:
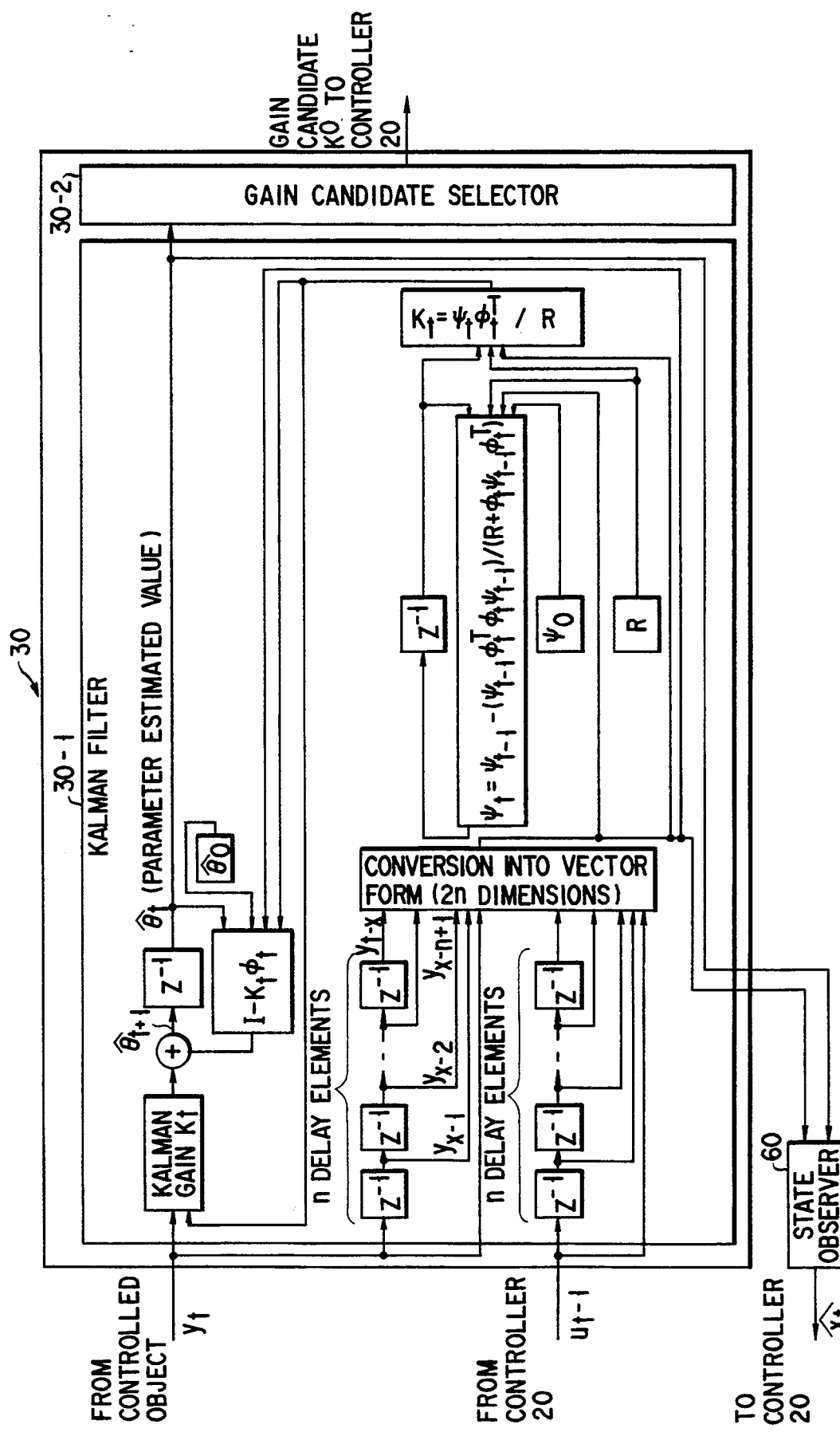
FIG. 9 is a block diagram showing the construction of an on-line identifier shown in FIGS. 1 and 4.

FIG. 9 is a block diagram showing the construction of the on-line identifier 30 shown in FIGS. 1 and 4. The on-line identifier 30 includes a Kalman filter 30-1 and a gain candidate selecting unit 30-2. The Kalman filter 30-1 of the on-line identifier 30 is generally used to estimate the system parameter $\hat{\theta}_t$ use of the input data u and output data y of the controlled object 10 when the controlled object 10 is dealt with as a model. The gain candidate selecting unit 30-2 outputs a gain candidate $K^0$ by using the estimated parameter $\hat{\theta}_t$ of the Kalman filter 30-1. First, a normal Kalman filter is explained. The meaning of the signals and the calculation method are the same as those indicated in the equations (2) to (10) in the first embodiment. The preceding outputs $y_{t-1}, \ldots, y_{t-n}$ (n indicates the dimension of the state) and the preceding inputs $u_{t-1}, \ldots, u_{t-n}$ of the controlled object are converted into a vector form $\phi_t$ as one data item. A covariance matrix $\psi_t$ at the present time is calculated based on the vector $\phi_t$, immediately preceding error covariance matrix $\psi_t$ and weighting matrix R, as given in the equation (9). The matrix R becomes scalar in the case of one-input/one-output system. In this case, the error covariance matrix at the initialization time is previously given as $\psi_0$. Next, the Kalman gain $K_t$ is calculated according to the equation (8) by use of the data $\phi_t$, weighting matrix R and covariance matrix $\psi_t$ at the present time. The immediately preceding estimated parameter $\hat{\theta}_{t-1}$ is corrected according to the equation (6) by use of the Kalman gain $K_t$ and the current output $y_t$ of the controlled object so as to derive a current estimated parameter $\hat{\theta}_t$.

FIG. 10A is a flowchart for illustrating the operation of the gain candidate selecting unit 30-2 of the on-line identifier 30 of FIG. 9, and FIG. 10B shows a parameter-gain table used in FIG. 10A. The estimated parameter $\hat{\theta}_t$ derived in the Kalman filter 30-1 is supplied to the gain candidate selecting unit 30-2. The gain candidate selecting unit 30-2 determines a gain candidate $K^0$ based on the estimated parameter $\hat{\theta}t$ according to the flowchart shown in FIG. 10A, and outputs the gain candidate to the controller 20. The way of determining the optimum gain candidate $K^0$ is different in the first embodiment and in the second embodiment. In the first embodiment, the parameter-gain table shown in FIG. 10B is prepared, the smallest norm $||\hat{\theta}-\theta 1||$ is selected while referring to the estimated parameter $\hat{\theta}_t$, and a corresponding gain is set as a gain candidate $K^0$. In this case, when the gain candidate $K^0$ is selected in order to set $K_0$ to K after it is determined that $(K-K^0) > \epsilon_2$ in the gain determining unit 20-6 of the controller 20 (FIG. 8), the table is made to prevent the gain used as the gain candidate $K^0$ before from being used. Next, in the second embodiment, the Ricatti equation is solved by use of the estimated parameter $\hat{\theta}t$, the feedback gain is calculated and the thus obtained gain is used as the gain candidate $K^0$. Thus, the gain candidate $K^0$ is determined and input to the gain determining unit 20-6 of the controller 20.

Figure 11:
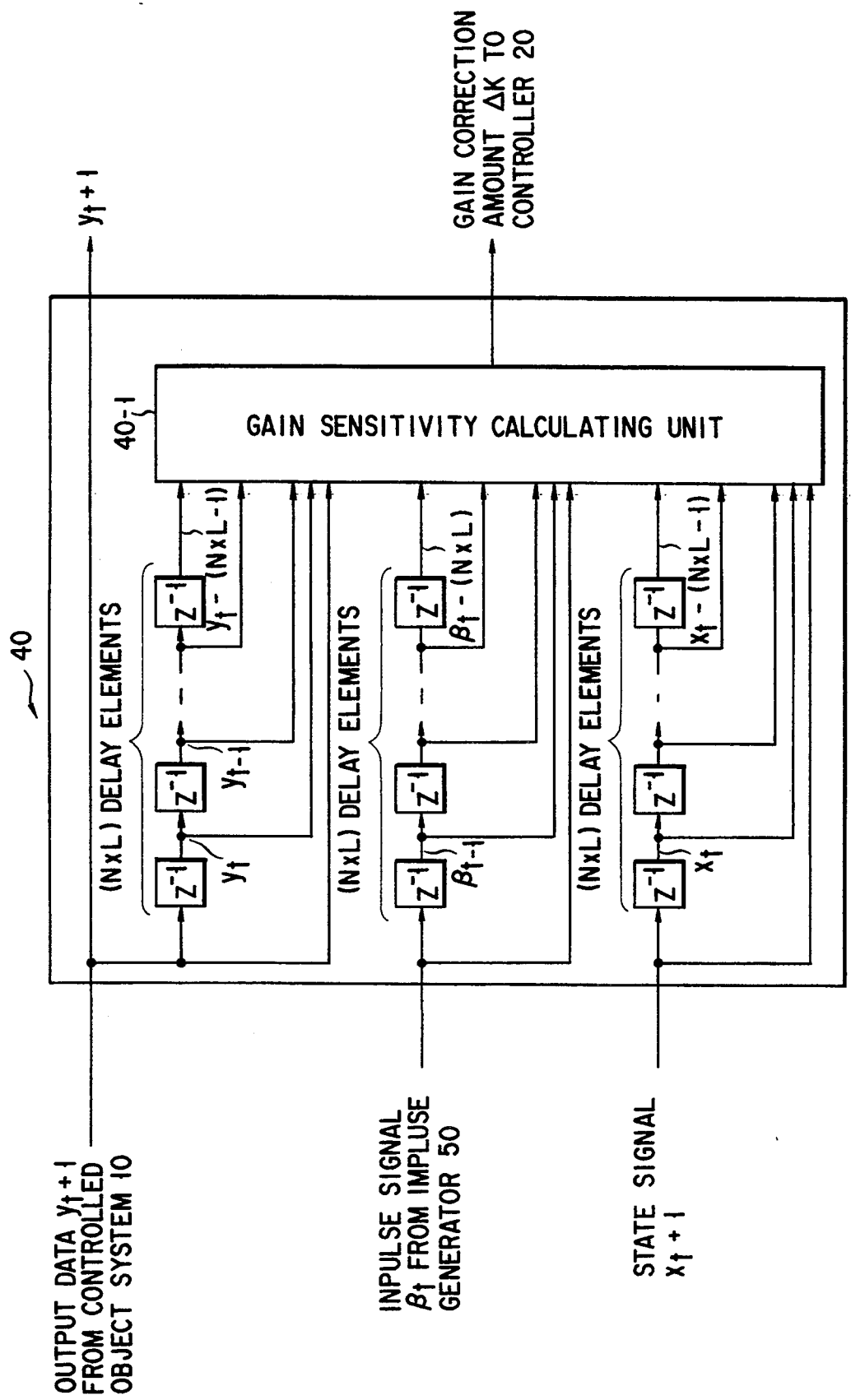
FIG. 11 is a block diagram showing the construction of a feedback gain sensitivity calculating section shown in FIGS. 1 and 4.

FIG. 11 is a block diagram showing the construction of the feedback gain sensitivity calculating unit 40 in FIGS. 1 and 4. The sensitivity calculating unit 40 receives N×L preceding outputs, impulse $\beta_t$ and state, and outputs a gain correction amount ΔK. Where, N is the number of data items, and the dimension of the state is equal to or more than n, L indicates an observation segment. In general, the state cannot be always observed, but in such a case, the state observer 60 is constructed and the state estimated value $x_t$ is used as the state. The sensitivity calculating unit 40 outputs the received output, impulse and state to the gain sensitivity calculator.

A method of deriving a gain correction amount ΔK in the gain sensitivity calculator 40-1 shown in FIG. 11 is explained with reference to FIG. 12. FIG. 12 shows the entire construction of the gain sensitivity calculator 40-1. The received impulse, state and output data are arranged (sequencing of data) in sequence setting circuits (S.C.) 40-1b and supplied to data converters (D.C.) 40-1a-1 of data creating units 40-1a and data is created in the data converters 40-1a-1. The main portion of the sensitivity calculator 40-1 includes calculators 40-1c for sequentially calculating the matrix Ω. The calculators 40-1c calculate the matrix Ω in the order of Ω(L−1) to Ω(0) with the initial value Ω(L)=I.

Figure 13:
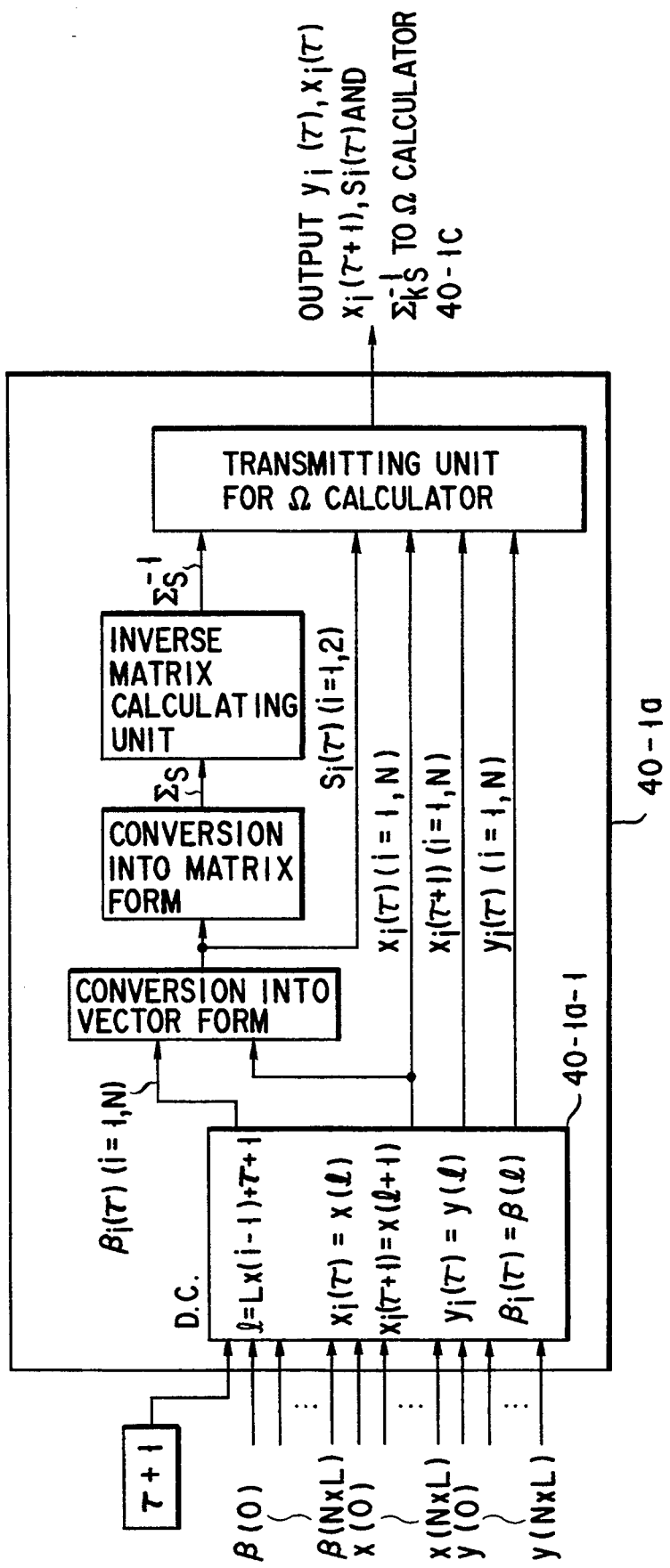
FIG. 13 is a block diagram showing the construction of a data creating circuit shown in FIG. 12.

The data creating unit 40-1a shown in FIG. 13 receives a sequential number $\tau$ (L, ..., 0) and data subjected to the sequencing process in the sequence setting circuit 40-1b and outputs yi($\tau$), xi($\tau$), xi($\tau$+1), Si($\tau$), and $\Sigma_{ks}^{-1}$ to the Ω calculator 40-1c. Signals of yi($\tau$) to $\Sigma_{k1s}^{-1}$ are processed according to the equations (26) to (28) as in the first embodiment. In the calculator 40-1c, Ω($\tau$) is calculated by using the output data of the data creating unit 40-1a and immediately preceding value Ω($\tau$−1) as shown by the equation (25). When Ω(0) is thus calculated, the sensitivity matrices Γ and H are calculated by use of the matrices Px, Pn and α according to the equations (31) and (32). The matrices Px and Pn are referred to the equations (29) and (30), and α is a learning coefficient. It is theoretically proved that the matrix Γ becomes a primary sensitivity and the matrix H becomes a secondary sensitivity. The gain correction amount ΔK is calculated according to the equation $$\Delta K = -\alpha H^{-1}\Gamma \text{ or } \Delta K = -\alpha\Gamma \qquad (45)$$

based on the sensitivity matrices Γ and H and used as an output of the feedback gain sensitivity calculating unit 40.

As described above according to the present invention since an optimum feedback gain is derived by the system identification method, and at the same time, the sensitivity of the state feedback gain of the controlled object is directly derived to effect the fine adjustment for the optimum feedback gain and the timing for initialization is given to the calculating section for the optimum state feedback gain derived by the on-line identification, it becomes possible to provide an adaptive control system and method which can attain the satisfactory response speed and precision even when the present invention is applied to the object system dynamic characteristic of which is significantly changed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An adaptive control system comprising:
   means for estimating a system parameter of a controlled object system;
   means for providing an initial value for correction of a feedback gain by use of the estimated system parameter;
   means for correcting a state feedback gain by a proper initial value which causes a sensitivity of the feedback gain to be set to zero; and
   means for causing said estimation means to effect the estimation again when the sensitivity of the feedback gain deviates from zero.

2. An adaptive control system comprising:
   on-line identification means for previously calculating and storing a plurality of known basic identifiers corresponding to a plurality of basic dynamic characteristics and basic state feedback gains corresponding to said basic identifiers;
   means for sequentially calculating a sensitivity of a selected basic state feedback gain based on on-line input/output data for a controlled object; and
   control means for determining one of the basic identifiers which corresponds to the current dynamic characteristic of said controlled object based on the on-line input/output data for said controlled object by use of the on-line identification means, selecting a basic state feedback gain corresponding to the determined basic identifier, determining whether the selected basic state feedback gain is optimum based on the result of calculation of the sensitivity, and finely adjusting the selected basic state feedback gain by using the calculated sensitivity and irregularly switching the plurality of dynamic characteristics when it is determined that the selected basic state feedback gain is not optimum.

3. An adaptive control system comprising:
   on-line identification means for receiving input data and output data of a controlled object, a dynamic characteristic of which changes, effecting on-line identification and deriving an optimum state feedback gain based on an evaluation function signifying the optimality and an identified system parameter of the controlled object;
   feedback gain sensitivity calculating means for receiving the input data and the output data of said controlled object and calculating a sensitivity of the optimum state feedback gain derived by said on-line identification means;
   control data calculating means for receiving the output data of said controlled object, deriving a state feedback input based on the output data and the optimum state feedback gain obtained by said on-line identification means and supplying the state feedback input to said controlled object as control input data;
   determining means for determining based on a criterion whether the sensitivity of the optimum state feedback gain derived by said feedback gain sensitivity calculating means is zero;
   gain adjusting means for determining that the state feedback gain is optimum when said determining means determines that the sensitivity of the state feedback gain is zero and finely adjusting the state feedback gain by use of the sensitivity when the sensitivity is determined to be near zero; and initialization instruction means for supplying an initialization instruction which initializes a covariance matrix in the on-line identification effected by said on-line identification means when said determining means determines that the sensitivity of the state feedback gain significantly deviates from zero.

4. An adaptive control method comprising the steps of:

estimating a system parameter of a controlled object system;

providing an initial value for correction of a feedback gain by use of the estimated system parameter;

correcting the state feedback gain by use of a proper initial value which causes a sensitivity of the feedback gain to be set to zero; and effecting the estimation of the system parameter again when the sensitivity of the feedback gain deviates from zero.

5. An adaptive control method comprising the steps of:

previously calculating and storing a plurality of known basic identifiers corresponding to a plurality of basic dynamic characteristics and basic state feedback gains corresponding to said basic identifiers;

sequentially calculating a sensitivity of a selected basic state feedback gain based on on-line input-/output data for a controlled object;

determining one of said basic identifiers which corresponds to a current dynamic characteristic of said controlled object based on the on-line input/output data for said controlled object by use of an on-line identification method and selecting a basic state feedback gain corresponding to the determined basic identifier;

determining based on the calculated sensitivity whether the selected basic state feedback gain is optimum; and finely adjusting the selected basic state feedback gain by using the calculated sensitivity and irregularly switching the basic dynamic characteristics when it is determined that the selected basic state feedback gain is not optimum.

6. An adaptive control method comprising the steps of: receiving input data and output data of a controlled object whose dynamic characteristic changes and determining a system parameter of said controlled object by on-line identification;

supplying optimum control data to said controlled object by deriving an optimum state feedback gain based on an evaluation function signifying the optimality and the system parameter of the controlled object;

deriving a sensitivity of the state feedback gain of said controlled object based on the input data and the output data of said controlled object;

determining the sensitivity based on the criterion;

determining that the state feedback gain is optimum when the sensitivity is determined to be zero;

finely adjusting the state feedback gain by using the sensitivity when the sensitivity is determined to be near zero; and initializing a covariance matrix in the on-line identification when the sensitivity significantly deviates from zero.

* * * * *